(12) United States Patent
Brannen

(10) Patent No.: US 9,655,306 B2
(45) Date of Patent: May 23, 2017

(54) TREE LIMB CUTTING DEVICE

(71) Applicant: Chris Brannen, Lynn Haven, FL (US)

(72) Inventor: Chris Brannen, Lynn Haven, FL (US)

( * ) Notice: Subject to any disclaimer, the term of this patent is extended or adjusted under 35 U.S.C. 154(b) by 0 days.

(21) Appl. No.: 14/882,629

(22) Filed: Oct. 14, 2015

(65) Prior Publication Data

US 2017/0105357 A1   Apr. 20, 2017

(51) Int. Cl.
*A01G 3/08* (2006.01)

(52) U.S. Cl.
CPC .............. *A01G 3/081* (2013.01); *A01G 3/085* (2013.01)

(58) Field of Classification Search
CPC .... A01G 3/0255; A01G 3/033; A01G 3/0335; A01G 3/081; A01G 3/085
USPC ............................................................. 30/228
See application file for complete search history.

(56) References Cited

U.S. PATENT DOCUMENTS

| 1,600,391 | A | | 9/1926 | Barrett | |
|---|---|---|---|---|---|
| 2,195,045 | A | * | 3/1940 | Bernay | A01G 3/0255 144/34.5 |
| 2,270,495 | A | * | 1/1942 | Bernay | A01G 3/0255 30/184 |
| 2,391,676 | A | * | 12/1945 | Browning | A01G 3/033 188/67 |
| 2,612,140 | A | * | 9/1952 | Miller | B25B 7/126 173/169 |
| 2,714,250 | A | * | 8/1955 | Twedt | A01G 3/033 30/180 |
| 3,041,725 | A | | 7/1962 | Harries | |
| 3,476,015 | A | * | 11/1969 | Ackley | A01G 3/033 30/228 |
| 4,198,748 | A | * | 4/1980 | Lewis | A01G 3/033 30/180 |
| 4,987,680 | A | | 1/1991 | Garrett | |
| 5,341,572 | A | * | 8/1994 | Michelson | A01G 3/033 30/228 |
| 5,613,301 | A | * | 3/1997 | Sheu | A01G 3/08 30/144 |
| 5,634,276 | A | | 6/1997 | Lin | |
| 5,711,078 | A | * | 1/1998 | Patton | B26B 15/00 30/182 |
| 5,826,341 | A | * | 10/1998 | Massa | A01G 3/08 30/247 |
| 5,894,667 | A | * | 4/1999 | Van Den Hout | B26B 15/00 30/249 |
| 5,950,315 | A | | 9/1999 | Linden | |
| D444,684 | S | | 7/2001 | Kimura | |
| 6,374,498 | B1 | * | 4/2002 | Liu | A01G 3/0255 30/211 |

(Continued)

*Primary Examiner* — Hwei C Payer

(57) ABSTRACT

A tree limb cutting device for trimming tree limbs includes a cutting head that comprises a housing that has a hook coupled to and extending from a top. A blade is positioned in pair of opposing channels positioned in an internal wall of the housing. The blade has a cutting edge and an impact end. An actuator, coupled to and positioned in the housing, is operationally coupled a driver that comprises a shaft which has a striking end and a stopping end. A blade return is operationally coupled to the blade and the driver. A driver return is coupled to the stopping end and the actuator. An extension rod has a first end a second end. The first end is coupled to the housing. A power module, operationally coupled to the actuator through a power line, is coupled to the second end.

20 Claims, 4 Drawing Sheets

(56) References Cited

U.S. PATENT DOCUMENTS

| | | | |
|---|---|---|---|
| 6,671,966 B2 * | 1/2004 | Lewis | B23D 29/002 30/228 |
| 6,694,621 B1 | 2/2004 | Boley et al. | |
| 6,901,665 B2 * | 6/2005 | Sun | A01G 3/0255 30/249 |
| 7,937,839 B2 * | 5/2011 | Fidgen | A01G 3/0255 30/135 |
| 9,009,921 B1 * | 4/2015 | Ramsey | E04D 13/0765 16/429 |

* cited by examiner

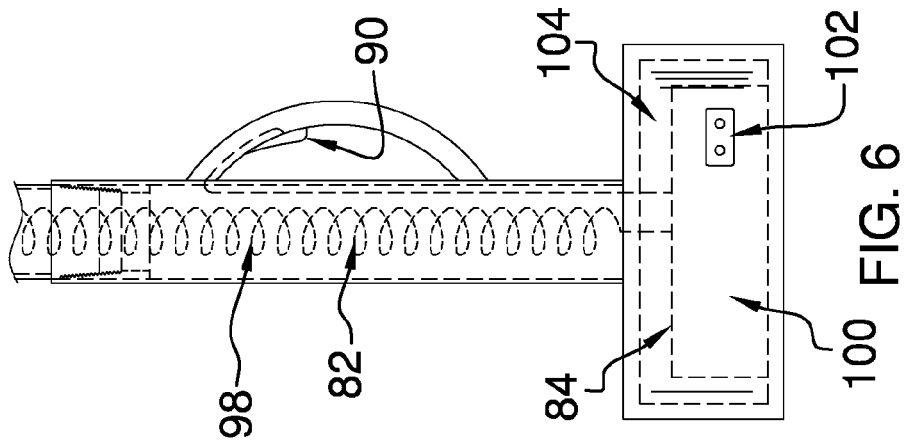
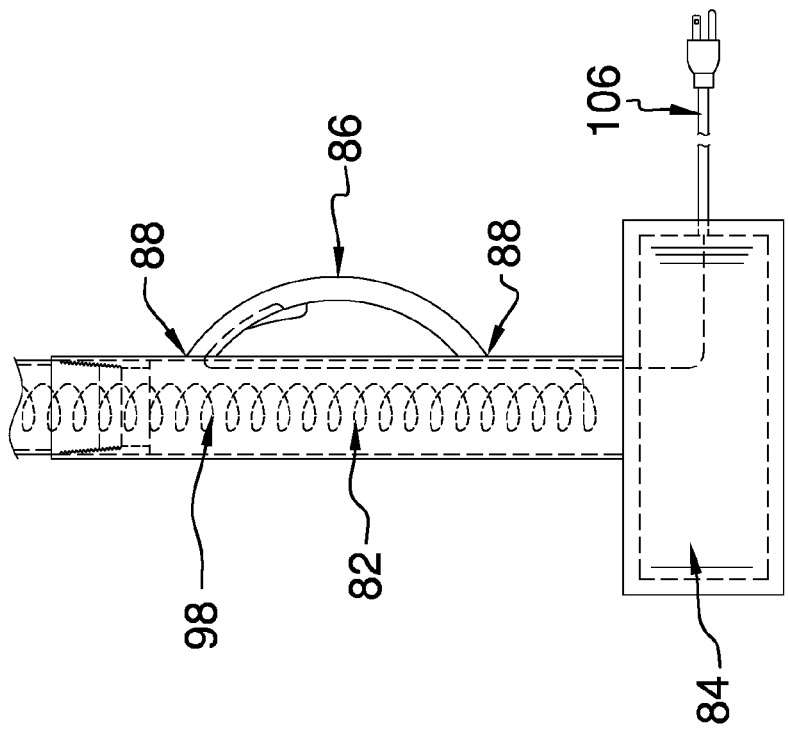

TREE LIMB CUTTING DEVICE

BACKGROUND OF THE DISCLOSURE

Field of the Disclosure

The disclosure relates to cutting devices and more particularly pertains to a new cutting device for trimming tree limbs.

SUMMARY OF THE DISCLOSURE

An embodiment of the disclosure meets the needs presented above by generally comprising a cutting head that comprises a housing that has a hook coupled to and extending from a top. A blade is positioned in pair of opposing channels positioned in an internal wall of the housing. The blade has a cutting edge and an impact end. An actuator, coupled to and positioned in the housing, is operationally coupled a driver that comprises a shaft which has a striking end and a stopping end. A blade return is operationally coupled to the blade and the driver. A driver return is coupled to the stopping end and the actuator. An extension rod has a first end a second end. The first end is coupled to the housing. A power module, operationally coupled to the actuator through a power line, is coupled to the second end.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a detail side cut-away view of an embodiment of the disclosure.

FIG. 6 is a detail side cut-away view of an embodiment of the disclosure.

DESCRIPTION OF THE PREFERRED EMBODIMENT

Figure 1:
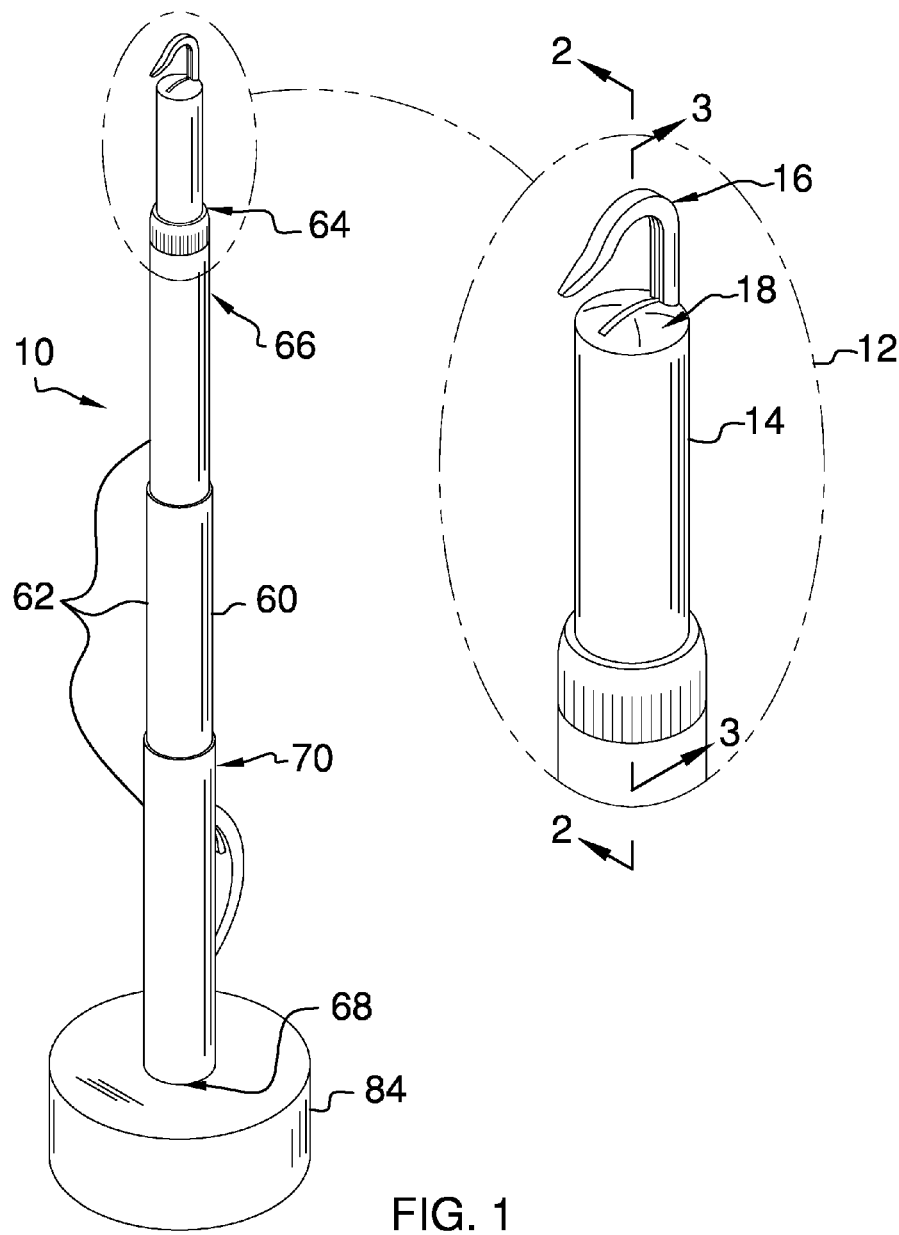
FIG. 1 is an isometric perspective and detail view of a tree limb cutting device according to an embodiment of the disclosure.
Figure 2:
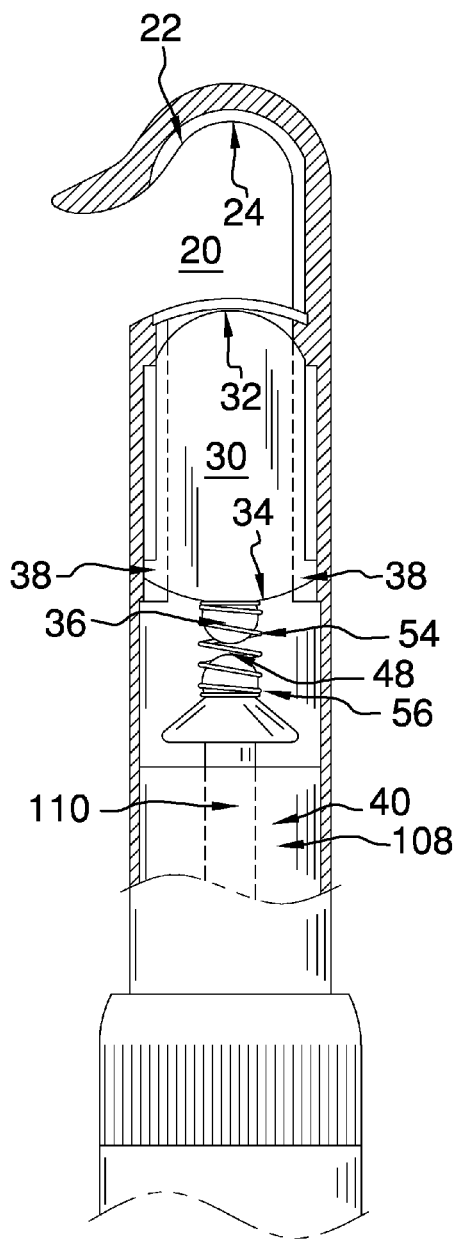
FIG. 2 is a detail side cut-away view of an embodiment of the disclosure.
Figure 3:
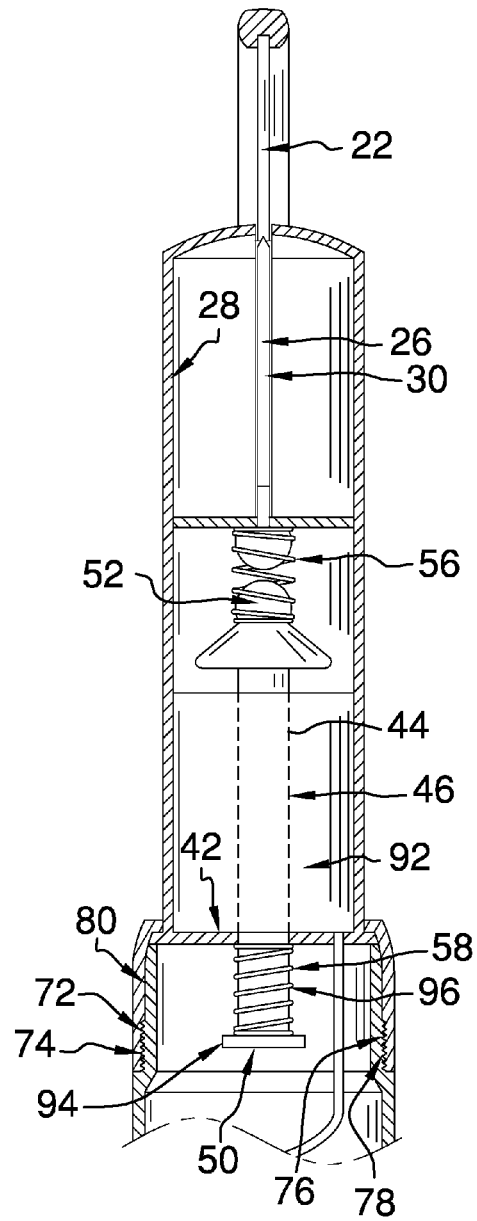
FIG. 3 is a detail front cut-away view of an embodiment of the disclosure.
Figure 4:
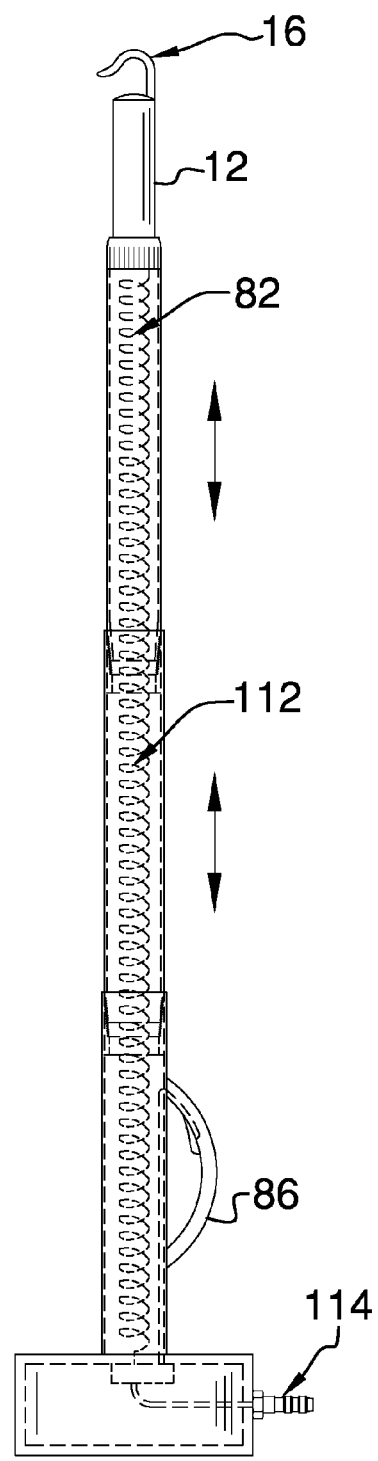
FIG. 4 is a side cut-away view of an embodiment of the disclosure.

With reference now to the drawings, and in particular to FIGS. 1 through 6 thereof, a new cutting device embodying the principles and concepts of an embodiment of the disclosure and generally designated by the reference numeral 10 will be described.

As best illustrated in FIGS. 1 through 6, the tree limb cutting device 10 generally comprises a cutting head 12 that comprises a housing 14. A hook 16 is coupled to and extends from a top 18 of the housing 14, such that the hook 16 defines a cutting plane 20. A groove 22 is positioned in an inner curve 24 of the hook 16. The inner curve 24 is arcuate. A pair of opposing channels 26 is positioned in an internal wall 28 of the housing 14. The channels 26 are positioned in the cutting plane 20 and extend downwardly from the top 18 of the housing 14. The channels 26 are shallower proximate to the top 18 defining a pair of stops. A respective one of the channels 26 connects to the groove 22. A blade 30 is positioned in the channels 26. The blade 30 has a cutting edge 32 and an impact end 34. The impact end 34 comprises a knob 36. The cutting edge 32 is complimentary to the inner curve 24 of the hook 16. A pair of extensions 38 is coupled to the blade 30 proximate to the impact end 34. The extensions 38 extend into the channels 26, such that the extensions 38 are positioned to engage the stops as the blade 30 is moved through the channels 26.

An actuator 40 is coupled to and positioned in the housing 14 proximate to a bottom 42 of the housing 14. A driver 44 is operationally coupled to the actuator 40. The driver 44 comprises a shaft 46 that has a striking end 48 and a stopping end 50. The striking end 48 comprises a flanged bulb 52. A blade return 54 is operationally coupled to the blade 30 and the driver 44. The blade return 54 comprises a first spring 56. A driver return 58 is coupled to the stopping end 50 and the actuator 40.

The device 10 includes an extension rod 60 that comprises a plurality of nested sections 62, such that the extension rod 60 is telescopic. The extension rod 60 has a first end 64 on the innermost nested section 66 and a second end 68 on the outermost nested section 70. The first end 64 is coupled to the housing 14. The plurality of nested sections 62 may comprise two to four sections, preferably three sections. Each of the plurality of sections 62 is between 0.5 and 5 meters in length. Preferably, each of the plurality of sections 62 is between 0.75 and 4 meters in length. More preferably, each of the plurality of sections 62 is between 1 and 3 meters in length.

A first fastener 72 is coupled to the bottom 42 of the housing 14. Preferably, the first fastener 72 comprises a threaded extension 74 of the housing 14. A second fastener 76 is coupled to the first end 64 of the extension rod 60. The second fastener 76 is complimentary to the first fastener 72, such that the first fastener 72 is positioned to couple to the second fastener 76 to secure the housing 14 to the extension rod 60. Preferably, the second fastener 76 comprises a threaded area 78 on an external surface 80 of the innermost nested section 66 proximate to the first end 64.

A power line 82 is positioned in the extension rod 60. The power line 82 is operationally coupled to the actuator 40. The power line 82 is coiled, such that the power line 82 is extendable as the nested sections 62 of the extension rod 60 are extended. A power module 84 is coupled to the second end 68 of the extension rod 60. The power module 84 is operationally coupled to the power line 82.

A handle 86 is coupled to the extension rod 60 proximate to the second end 68. The handle 86 is arcuate with opposing ends 88. The opposing ends 88 are coupled to the extension rod 60 proximate to the second end 68. A switch 90 is positioned is the handle 86. The switch 90 is operationally coupled to the power module 84.

In one embodiment of the invention, the actuator 40 comprises a solenoid 92 and the stopping end 50 comprises a circular protrusion 94. The shaft 46 is positioned in the solenoid 92. The driver return 58 comprises a second spring 96 positioned around the shaft 46 between the stopping end 50 and the actuator 40. The power line 82 comprises an electrical cord 98 and the power module 84 comprises at least one rechargeable battery 100. The power module 84 has a recharge connector 102 positioned in a wall 104 of the power module 84, such that the actuator 40 is powered by direct current. In a related embodiment of the invention, the power module 84 comprises a power cord 106 that extends through the wall 104, such that the actuator 40 is powered by alternating current.

In another embodiment of the invention the actuator 40 comprises an air hammer 108 and the shaft 46 comprises a striker 110 of the air hammer 108. The power line 82 comprises a compressed air hose 112 and the power module 84 comprises a compressed air connector 114 positioned in the wall 104 of the power module 84, such that the actuator 40 is powered by compressed air.

In use, the hook 16 is positioned to receive into the cutting plane 20 a limb to be trimmed, such that the user may engage the actuator 40 using the switch 90 to compel the driver 44 into the blade 30, such that the blade 30 is propelled into and severs the limb through one or more interactions of the driver 44 with the blade 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tree limb cutting device comprising:
  a cutting head, said cutting head comprising:
    a housing,
    a hook, said hook being coupled to and extending from a top of said housing,
    a pair of opposing channels, said channels being positioned in an internal wall of said housing,
    a blade, said blade being positioned in said pair of opposing channels, said blade having a cutting edge and an impact end,
    an actuator, said actuator being coupled to and positioned in said housing,
    a driver, said driver being operationally coupled to said actuator, said driver comprising a shaft having a striking end and a stopping end,
    a blade return, said blade return being operationally coupled to said blade and said driver,
    a driver return, said driver return being coupled to said stopping end and said actuator;
  an extension rod, said extension rod comprising a plurality of nested sections, wherein said extension rod is telescopic, said extension rod having a first end on the innermost nested section and a second end on the outermost nested section, said first end being coupled to said housing;
  a power line, said power line being positioned in said extension rod, said power line being operationally coupled to said actuator; and
  a power module, said power module being coupled to said second end of said extension rod, said power module being operationally coupled to said power line.

2. The device of claim 1, further including a groove, said groove being positioned in an inner curve of said hook, said inner curve being arcuate.

3. The device of claim 2, further comprising:
  said channels being positioned in a cutting plane defined by said hook;
  said channels extending downwardly from said top of said housing;
  said channels being shallower proximate to said top defining a pair of stops; and
  a respective one of said channels connecting to said groove.

4. The device of claim 3, further comprising:
  said impact end comprising a knob;
  said cutting edge being complimentary to an inner curve of said hook;
  a pair of extensions, said extensions being coupled to said blade proximate to said impact end, said extensions extending into said channels; and
  wherein said extensions are positioned to engage said stops as said blade is moved through said channels.

5. The device of claim 1, further including said actuator being proximate to a bottom of said housing.

6. The device of claim 1, further comprising:
  said actuator comprising a solenoid;
  said striking end comprising a flanged bulb;
  said stopping end comprising a circular protrusion;
  said shaft being positioned in said solenoid;
  said blade return comprising a first spring;
  said driver return comprising a second spring, said second spring being positioned around said shaft between said stopping end and said actuator;
  said power line being coiled, such that said power line is extendable as said nested sections of said extension rod are extended, said power line comprising an electrical cord;
  said power module comprising at least one rechargeable battery; and
  said power module having a recharge connector positioned in a wall of said power module, such that said actuator is powered by direct current.

7. The device of claim 6, further including said power module comprising a power cord extending through said wall, such that said actuator is powered by alternating current.

8. The device of claim 1, further comprising:
  said actuator comprising an air hammer;
  said shaft comprising a striker of said air hammer;
  said blade return comprising a first spring;
  said power line being coiled, such that said power line is extendable as said nested sections of said extension rod are extended;
  said power line comprising a compressed air hose; and said power module comprising a compressed air connector positioned in a wall of said power module, such that said actuator is powered by compressed air.

9. The device of claim 1, further including said plurality of nested sections comprising two to four sections.

10. The device of claim 9, further including said plurality of sections comprising three sections.

11. The device of claim 1, further including each of said plurality of sections being between 0.5 and 5 meters in length.

12. The device of claim 11, further including each of said plurality of sections being between 0.75 and 4 meters in length.

13. The device of claim 12, further including each of said plurality of sections being between 1 and 3 meters in length.

14. The device of claim 1, further comprising:
a first fastener, said first fastener being coupled to said bottom of said housing;
a second fastener, said second fastener being coupled to said first end of said extension rod, said second fastener being complimentary to said first fastener; and
wherein said first fastener is positioned to couple to said second fastener to secure said housing to said extension rod.

15. The device of claim 14, further comprising:
said first fastener comprising a threaded extension of said housing; and
said second fastener comprising a threaded area on an external surface of said innermost nested section proximate to said first end.

16. The device of claim 1, further comprising:
a handle, said handle being coupled to said extension rod proximate to said second end, said handle being arcuate with opposing ends, said opposing ends being coupled to said extension rod proximate to said second end; and
a switch, said switch being positioned is said handle, said switch being operationally coupled to said power module.

17. A tree limb cutting device comprising:
a cutting head, said cutting head comprising:
a housing,
a hook, said hook being coupled to and extending from a top of said housing, wherein said hook defines a cutting plane,
a groove, said groove being positioned in an inner curve of said hook, said inner curve being arcuate,
a pair of opposing channels, said channels being positioned in an internal wall of said housing, said channels being positioned in said cutting plane, said channels extending downwardly from said top of said housing, said channels being shallower proximate to said top defining a pair of stops, a respective one of said channels connecting to said groove,
a blade, said blade being positioned in said pair of opposing channels, said blade having a cutting edge and an impact end, said impact end comprising a knob, said cutting edge being complimentary to said inner curve of said hook,
a pair of extensions, said extensions being coupled to said blade proximate to said impact end, said extensions extending into said channels, wherein said extensions are positioned to engage said stops as said blade is moved through said channels,
an actuator, said actuator being coupled to and positioned in said housing proximate to a bottom of said housing,
a driver, said driver being operationally coupled to said actuator, said driver comprising a shaft having a striking end and a stopping end, said striking end comprising a flanged bulb,
a blade return, said blade return being operationally coupled to said blade and said driver, said blade return comprising a first spring, and
a driver return, said driver return being coupled to said stopping end and said actuator;
an extension rod, said extension rod comprising a plurality of nested sections, wherein said extension rod is telescopic, said extension rod having a first end on the innermost nested section and a second end on the outermost nested section, said first end being coupled to said housing, said plurality of sections comprising three sections, each of said plurality of sections being between 1 and 3 meters in length;
a first fastener, said first fastener being coupled to said bottom of said housing, said first fastener comprising a threaded extension of said housing;
a second fastener, said second fastener being coupled to said first end of said extension rod, said second fastener being complimentary to said first fastener, such that said first fastener is positioned to couple to said second fastener to secure said housing to said extension rod, said second fastener comprising a threaded area on an external surface of said innermost nested section proximate to said first end;
a power line, said power line being positioned in said extension rod, said power line being operationally coupled to said actuator, said power line being coiled, such that said power line is extendable as said nested sections of said extension rod are extended;
a power module, said power module being coupled to said second end of said extension rod, said power module being operationally coupled to said power line;
a handle, said handle being coupled to said extension rod proximate to said second end, said handle being arcuate with opposing ends, said opposing ends being coupled to said extension rod proximate to said second end;
a switch, said switch being positioned is said handle, said switch being operationally coupled to said power module; and
wherein said hook is positioned to receive into said cutting plane a limb to be trimmed, such that a user can engage said actuator to compel said driver into said blade, wherein said blade is propelled into and severs the limb through one or more interactions of said driver with said blade.

18. The device of claim 17, further comprising:
said actuator comprising a solenoid;
said stopping end comprising a circular protrusion;
said shaft being positioned in said solenoid;
said driver return comprising a second spring, said second spring being positioned around said shaft between said stopping end and said actuator;
said power line comprising an electrical cord;
said power module comprising at least one rechargeable battery; and
said power module having a recharge connector positioned in a wall of said power module, such that said actuator is powered by direct current.

19. The device of claim 18, further including said power module comprising a power cord extending through said wall, such that said actuator is powered by alternating current.

20. The device of claim 17, further comprising:
said actuator comprising an air hammer;
said shaft comprising a striker of said air hammer;
said power line comprising a compressed air hose; and
said power module comprising a compressed air connector positioned in a wall of said power module, such that said actuator is powered by compressed air.

* * * * *